United States Patent
Chu

(10) Patent No.: US 9,304,884 B2
(45) Date of Patent: Apr. 5, 2016

(54) TEST APPARATUS FOR TESTING TWO COMMUNICATION PROTOCOL CHIPS BASED ON POWER RELAY SIGNALS

(71) Applicants: Inventec (Pudong) Technology Corporation, Shanghai (CN); INVENTEC CORPORATION, Taipei (TW)

(72) Inventor: Chun-Hao Chu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 402 days.

(21) Appl. No.: 14/053,243

(22) Filed: Oct. 14, 2013

(65) Prior Publication Data
US 2014/0359358 A1    Dec. 4, 2014

(30) Foreign Application Priority Data
May 28, 2013    (CN) .......................... 2013 1 0204925

(51) Int. Cl.
*G06F 11/22*    (2006.01)
*G06F 11/273*    (2006.01)

(52) U.S. Cl.
CPC ........ *G06F 11/2736* (2013.01); *G06F 11/2221* (2013.01); *G06F 11/2205* (2013.01); *G06F 11/2242* (2013.01)

(58) Field of Classification Search
CPC ............ G06F 11/2221; G06F 11/2242; G06F 11/2205
See application file for complete search history.

(56) References Cited

U.S. PATENT DOCUMENTS

| | | | | |
|---|---|---|---|---|
| 4,606,024 A * | 8/1986 | Glass | .................. | G06F 11/2236 714/27 |
| 6,137,287 A * | 10/2000 | Ichihashi | ........... | G01R 31/2829 324/160 |
| 2008/0301511 A1* | 12/2008 | Miller | .............. | G01R 31/31926 714/733 |
| 2010/0042874 A1* | 2/2010 | Lee | ..................... | G06F 11/2221 714/27 |

* cited by examiner

*Primary Examiner* — Joseph Schell
(74) *Attorney, Agent, or Firm* — Locke Lord LLP; Tim Tingkang Xia, Esq.

(57) ABSTRACT

A test apparatus applicable to a server includes a processing unit, a control unit, a switch unit and a power relay unit. The processing unit outputs a reset signal and a processing signal. The control unit includes a first physical layer chip performing a first communication protocol, and a second physical layer chip performing a second communication protocol. The switch unit receives a working voltage and a processing signal to select a powering signal or a disconnection signal to output. The power relay unit receives the powering signal or the disconnection signal. When the power relay unit receives the powering signal, the server performs a test task on the first physical layer chip. When the power relay unit receives the disconnection signal and the processing unit outputs the reset signal to the control unit, the server performs the test task on the second physical layer chip.

6 Claims, 1 Drawing Sheet

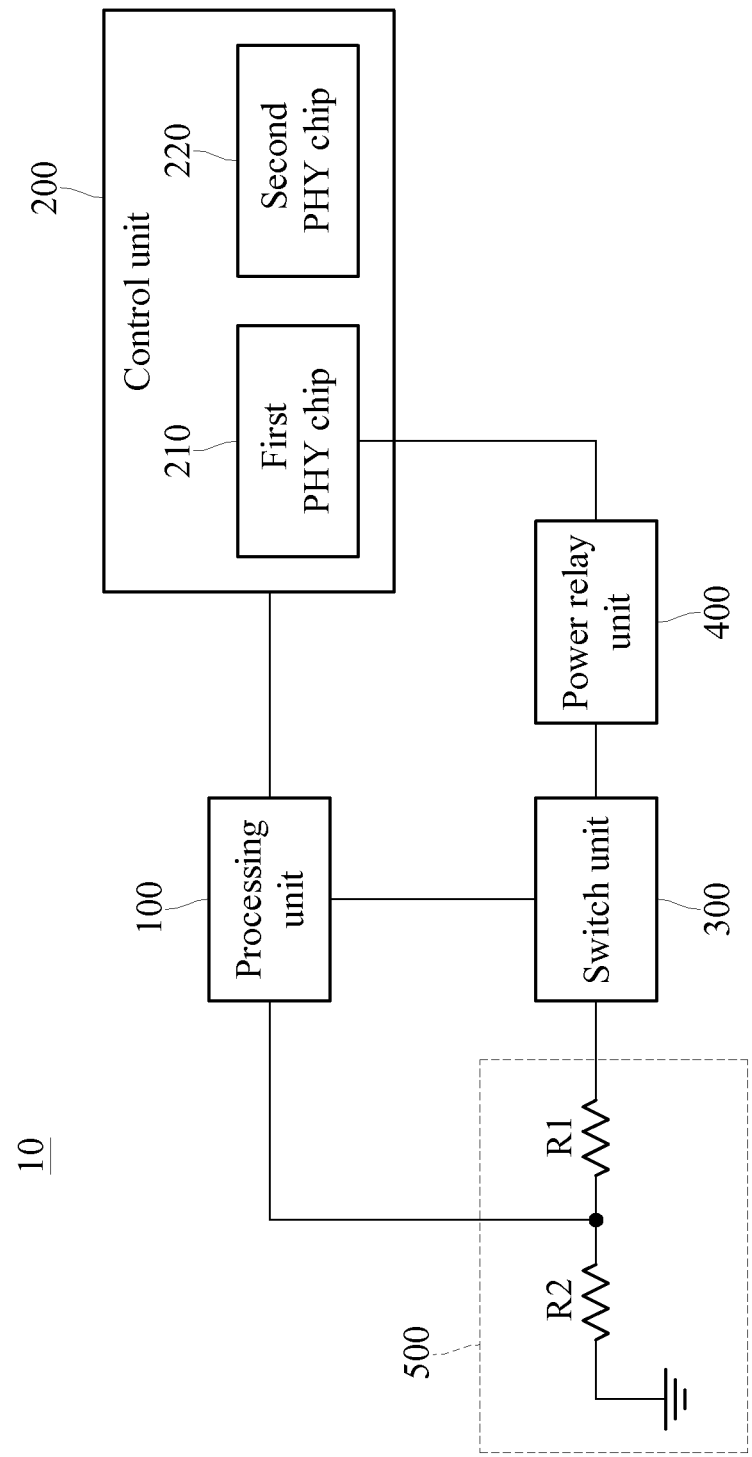

US 9,304,884 B2

TEST APPARATUS FOR TESTING TWO COMMUNICATION PROTOCOL CHIPS BASED ON POWER RELAY SIGNALS

CROSS-REFERENCE TO RELATED APPLICATIONS

This non-provisional application claims priority under 35 U.S.C. §119(a) on Patent Application No(s). 201310204925.3 filed in China on May 28, 2013, the entire contents of which are hereby incorporated by reference.

BACKGROUND OF THE INVENTION

1. Technical Field of the Invention

The disclosure relates to a test apparatus, and more particularly to a test apparatus capable of enhancing test convenience and test efficiency.

2. Description of the Related Art

With the development of electronic technology, electronic products usually have connectors for connecting to other electronic devices. For example, such an electronic product connects to a server.

In the case of the server, various connectors such as universal serial bus (USB) connectors may be disposed on the main board of the server. Hence, various production tests, e.g. the connection tests to various connectors and the function tests to the electronic products, are very important to guarantee the quality of each electronic product after the electronic products are produced.

During the production test, these connectors are coupled to a test platform, so that the test platform can test the connection function of the connectors and the functions of the product. However, when the connectors are repeatedly plugged in and pulled out the test platform manually, the normal connectors may be damaged because of the uneven applied force. On the other hand, the USB protocols have various versions such as the USB 3.0 and the USB 2.0, and such a conventional test platform generally does not have a common test interface with high compatibility to support various protocol versions. This requires that the connector has to be pulled out from one test platform and then be plugged into another, resulting in the increase of times of plugging or pulling and the reduction of test efficiency.

SUMMARY OF THE INVENTION

A test apparatus according to an embodiment of the disclosure is applicable to a server and includes a processing unit, a control unit, a switch unit and a power relay unit. The processing unit is configured to output a reset signal and a processing signal. The control unit is coupled to the processing unit and includes a first physical layer chip and a second physical layer chip. The first physical layer chip is configured to perform a first communication protocol, and the second physical layer chip is configured to perform a second communication protocol different from the first communication protocol. The switch unit is coupled to the processing unit and is configured to receive a working voltage and the processing signal, and according to the processing signal, to select either a powering signal or a disconnection signal to output. The power relay unit is coupled to the switch unit and is configured to receive the powering signal or the disconnection signal. When the power relay unit receives the powering signal, the server performs a test task on the first physical layer chip. When the power relay unit receives the disconnection signal and the processing unit outputs the reset signal to the control unit, the server performs the test task on the second physical layer chip.

BRIEF DESCRIPTION OF THE DRAWINGS

The present disclosure will become more fully understood from the detailed description given herein below for illustration only and thus does not limit the present disclosure, wherein:

FIG. 1 is a schematic diagram of a test apparatus according to the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram of a test apparatus according to the disclosure. A test apparatus 10 is applicable to a server. In other words, users can perform the function tests on the connectors disposed in the server via the test apparatus 10. The test apparatus 10 includes a processing unit 100, a control unit 200, a switch unit 300 and a power relay unit 400.

The processing unit 100 is configured to output a reset signal and a processing signal. For example, the processing unit 100 is a microcontroller unit (MCU) or other similar components.

The control unit 200 is coupled to the processing unit 100 and includes a first physical layer chip (PHY chip) 210 and a second physical layer chip 220. The first physical layer chip 210 performs a first communication protocol, and the second physical layer chip 220 performs a second communication protocol different from the first communication protocol. For example, the first communication protocol is the USB 3.0, and the second communication protocol is the USB 2.0. For example, the first physical layer chip 210 and the second physical layer chip 220 are USB PHY chips or other similar components.

The switch unit 300 is coupled to the processing unit 100 and is configured to receive a working voltage and a processing signal and select either a powering signal or a disconnection signal to output according to the processing signal. In this or some embodiments, the powering signal indicates outputting the working voltage, and the disconnection signal indicates not outputting the working voltage. For example, the switch unit 300 is embodied by P-type metal oxide semiconductor field effect transistors (MOSFETs), N-type MOSFETs, bipolar junction transistors (BJTs) or other similar components.

The power relay unit 400 is coupled to the switch unit 300, and is configured to receive the powering signal or the disconnection signal to determine whether to supply power, i.e. the working voltage, to the first physical layer chip 210 or not. For example, the power relay unit 400 is a Repeater or other similar components.

Furthermore, the test apparatus 10 includes a detection unit 500. The detection unit 500 is coupled between the processing unit 100 and the switch unit 300, and is configured to detect the working voltage and control the switch unit 300 to output the powering signal or the disconnection signal according to the detection result. For instance, when the detection unit 500 has detected the working voltage, the detection unit 500 will control the switch unit 300 to output the powering signal or the disconnection signal according to the processing signal. When not detecting the working voltage, the detection unit 500 will alarm and notify users to perform corresponding processes. In this way, the detection unit 500 can ensure the working voltage can be supplied normally.

In this and some embodiments, the detection unit 500 includes a first resistor R1 and a second resistor R2. The first resistor R1 has a first end and a second end. The first end of the first resistor R1 is coupled to the switch unit 300, and the second end of the first resistor R1 is coupled to the processing unit 100. The second resistor R2 has a first end and a second end. The first end of the second resistor R2 is coupled to the second end of the first resistor R1, and the second end of the second resistor R2 is grounded. The resistance of the first resistor R1 and the resistance of the second resistor R2 can be designed according to real application requests.

An exemplary description is taken as follows for the explanation of the operation of the disclosure. When the processing unit 100 outputs the processing signal at the high logic level, the switch unit 300 is turned on and outputs the powering signal to the power relay unit 400. Herein, when the power relay unit 400 receives the powering signal, the power relay unit 400 supplies power to the first physical layer chip 210 for the operation of the first physical layer chip 210. Subsequently, the server communicates with the first physical layer chip 210 and performs a test task on the first physical layer chip 210.

Otherwise, when the processing unit 100 outputs the processing signal at the low logic level, the switch unit 300 is turned off and outputs the disconnection signal to the power relay unit 400. Herein, when the power relay unit 400 receives the disconnection signal, the power relay unit 400 does not supply power to the first physical layer chip 210, whereby the first physical layer chip 210 will not work. Moreover, the processing unit 100 also outputs a reset signal to the control unit 200 to reset the first physical layer chip 210 and the second physical layer chip 220 in the control unit 200. Subsequently, the server communicates with the second physical layer chip 220 and performs the test task on the second physical layer chip 220.

In this way, the test apparatus 10 according to the aforementioned design allows the server to perform various test tasks on the connectors under various protocol versions simultaneously. In other words, via the test apparatus 10, the test task to both of the USB 3.0 and the USB 2.0 can be performed.

As set forth above, the server will perform a test task on the first physical layer chip when the power relay unit receives the powering signal after the processing unit outputs the processing signal at the high logic level. Otherwise, the server will perform the test task on the second physical layer chip when the power relay unit receives the disconnection signal after the processing unit outputs the processing signal at the low logic level to the switch unit and the reset signal to the control unit. In this way, the test apparatus in the disclosure can be efficiently used as a common interface for the production tests, whereby the convenience and efficiency may be enhanced.

What is claimed is:

1. A test apparatus, being applicable to a server and comprising:
    a processing unit configured to output a reset signal and a processing signal;
    a control unit coupled to the processing unit and comprising a first physical layer chip and a second physical layer chip, the first physical layer chip configured to perform a first communication protocol, and the second physical layer chip configured to perform a second communication protocol different from the first communication protocol;
    a switch unit coupled to the processing unit and configured to receive a working voltage and the processing signal, and according to the processing signal, select either a powering signal or a disconnection signal to output; and
    a power relay unit coupled to the switch unit and configured to receive the powering signal or the disconnection signal,
    wherein the server performs a test task on the first physical layer chip when the power relay unit receives the powering signal, and the server performs the test task on the second physical layer chip when the processing unit outputs the reset signal to the control unit and the power relay unit receives the disconnection signal.

2. The test apparatus according to claim 1, wherein the processing unit is a microcontroller unit.

3. The test apparatus according to claim 1, wherein the first communication protocol is the USB 3.0 and the second communication protocol is the USB 2.0.

4. The test apparatus according to claim 1, wherein the switch unit comprises a P-type metal oxide semiconductor field effect transistor.

5. The test apparatus according to claim 1, further comprising:
    a detection unit coupled to the switch unit and configured to detect a working voltage, and according to a detection result, the switch unit outputting the powering signal or the disconnection signal.

6. The test apparatus according to claim 5, wherein the detection unit comprises:
    a first resistor having a first end and a second end, the first end of the first resistor being coupled to the switch unit, and the second end of the first resistor being coupled to the processing unit; and
    a second resistor having a first end and a second end, the first end of the second resistor being coupled to the second end of the first resistor, and the second end of the second resistor being grounded.

* * * * *